United States Patent [19]
Simmons

[11] Patent Number: 6,083,095
[45] Date of Patent: Jul. 4, 2000

[54] NOZZLE FOR POULTRY WASHER

[75] Inventor: Lacy Simmons, deceased, late of Marietta, Ga., by Juanita Simmons, legal representative

[73] Assignee: SEC, Inc, Dallas, Ga.

[21] Appl. No.: 09/170,067

[22] Filed: Oct. 13, 1998

[51] Int. Cl.[7] .................................................... A22C 5/18
[52] U.S. Cl. ............................................ 452/123; 452/173
[58] Field of Search .................................. 452/123, 173, 452/76, 77, 81, 116

[56] References Cited

U.S. PATENT DOCUMENTS

| | | | |
|---|---|---|---|
| Re. 34,149 | 12/1992 | Markert | 452/173 |
| 2,427,840 | 9/1947 | Davis | 452/123 |
| 3,803,669 | 4/1974 | Dillon | 452/173 |
| 5,041,054 | 8/1991 | Van Den Nieuwelaar et al. | 452/173 |
| 5,178,579 | 1/1993 | Simmons | 452/173 |

*Primary Examiner*—Willis Little
*Attorney, Agent, or Firm*—Eric P. Schellin

[57] ABSTRACT

An improved nozzle for poultry washer nozzle for insertion into the cavity of an eviscerated poultry. The washer has an axial central tube upon which is mounted a rotatable cylinder as a distal portion and a proximate rib portion spaced from said tube. Orifices between the tube and internally of the cylinder provides cleansing liquid to the inside of the cylinder from which it flows through tangential offices in the cylinder. The proximate rib portion is detailed to center the poultry about the washer.

5 Claims, 2 Drawing Sheets

NOZZLE FOR POULTRY WASHER

BACKGROUND OF THE INVENTION

In the field of poultry processing, there is a need to remove contaminates left in a body cavity of an eviscerated bird. The rupturing of a part of the digestive tract and spilling the contents therein onto the cavity walls contaminates the eviscerated bird with bacteria contained in the gut and will lead to the rejection of the bird for human consumption. To date only a small number of poultry washers have been commercialized to remedy this problem.

U.S. Pat. No. 5,178,579 was such a response for cleansing the body cavity in an efficient and quick manner as part of an automated poultry slaughtering line, and is incorporated herein by reference in its entirety. A poultry washer was mounted on a module for synchronously moving the washer into the body cavity of the eviscerated bird as the bird travels down a treatment line. Within the body cavity, the washer dispenses pressurized liquid through tangentially directed orifices on a rotating cylindrically shaped core. The core runs substantially the entire length of the washer, and is surrounded by a symmetrically and circumferentially shaped cage for spacing the core from the body cavity walls. No consideration is given to the shape of the body cavity.

U.S. Pat. No. 5,041,054 discloses a poultry washer having radially projecting plates parallel with the long axis of the washer and proximal to the spraying element. The plates have serrated edges to tear and disrupt membranes left behind after evisceration. The projecting plates also act as spacers to open the body cavity to discharge the cleaning liquid.

Other washers for flushing the body cavities of eviscerated birds can be found in U.S. Pat. Nos. 4,899,421; 4,557,016; 4,421,277; 4,185,359; 4,106,161; 3,803,669; and Re. 34,149.

To date no attempt has been made to create a washer that conforms to the contours of the ventral cavity of the eviscerated bird. The ventral cavity is the hollow portion of the bird torso extending from the neck to the pelvis and containing the heart and the organs of respiration, digestion, reproduction, and elimination. The ventral cavity can be subdivided into three distinct areas: thoracic, abdominal, and pelvic. The thoracic cavity is the area of the chest containing the heart and the lungs along with other organs. The abdominal cavity is the space below the rib cage containing the kidney, stomach, intestines, and other organs of digestion. The pelvic cavity is the space formed by the bones of the pelvic area and contains the organs of reproduction and eliminations.

A washer probe that conforms to the ventral cavity is needed for the following reasons: the increasing speed of poultry slaughtering lines, the increasing stringent standards set by the FDA for contamination free poultry, and the increasing expense in disposing of contaminated cleansing liquids. The speed of the slaughtering line is forever increasing leaving less time for washer to clean the ventral cavity. A washer is needed that enters the cavity quickly, and thoroughly washes the cavity walls, while minimizing damage to the bird. It is important to minimize liquid wastes produced during the washing process for environmental and economical reasons. The present invention meets the need to minimizing damage to the bird, minimize cleansing liquids used, while maximizing cleansing of the ventral cavity of an eviscerated bird all on an automated slaughtering line.

SUMMARY OF INVENTION

The present invention provides a poultry washer that enters the body cavity of an eviscerated bird, and thoroughly washes the walls of the body cavity with pressurized liquid, such as water, in an efficient and economical manner. The washer comprises a proximal and a distal regions. The proximal region comprises a plurality of bars having a function to correctly position the entire washer in the ventral cavity to maximize washing while minimizing the liquid used. A plurality of liquid orifices are disposed in the distal region for directing pressurized liquid at the abdominal/pelvic cavity walls. The distal region having a low radial profile has a cylindrically shaped core that rotates by the emanation of pressurized liquids through tangential orifices spaced along the core and directing the liquid onto the walls of the thoracic cavity. Also disclosed is a method of using the poultry washer.

DETAILED DESCRIPTION OF THE INVENTION

Figure 1:
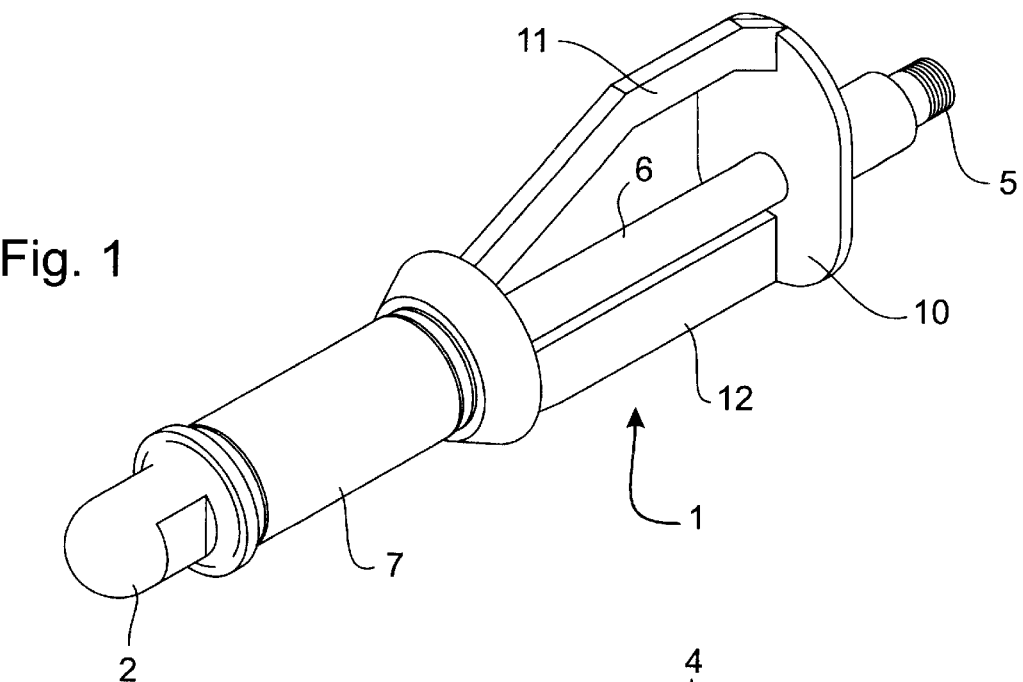
FIG. 1 is a perspective view of the washer of the present invention.
Figure 2:
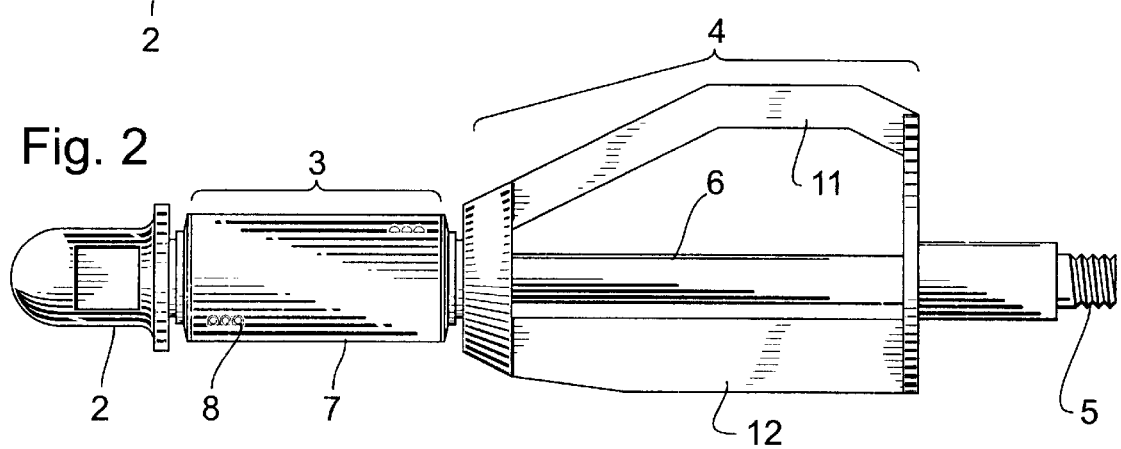
FIG. 2 is a side view of the washer of the present invention.
Figure 3:
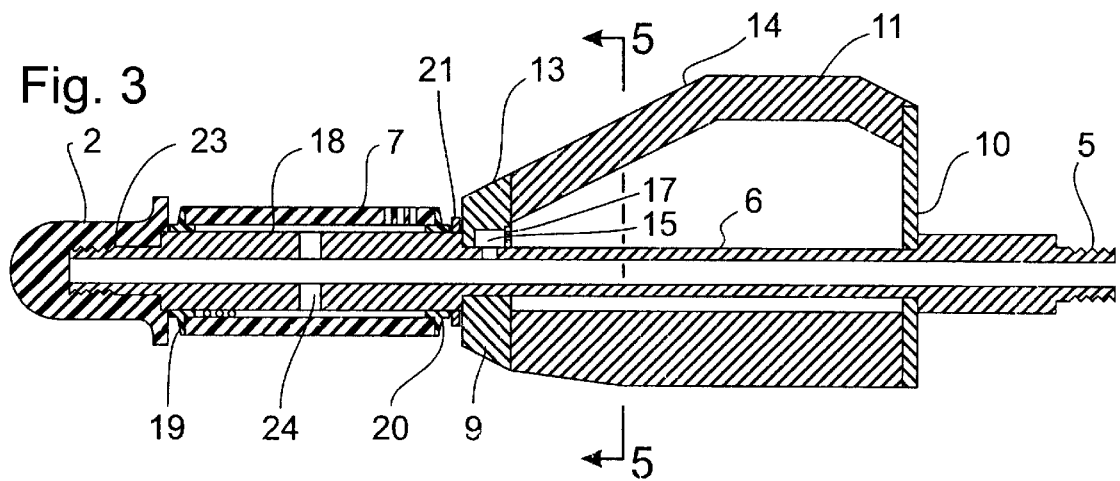
FIG. 3 is a cross-sectional view of the washer of the present invention.
Figure 4:
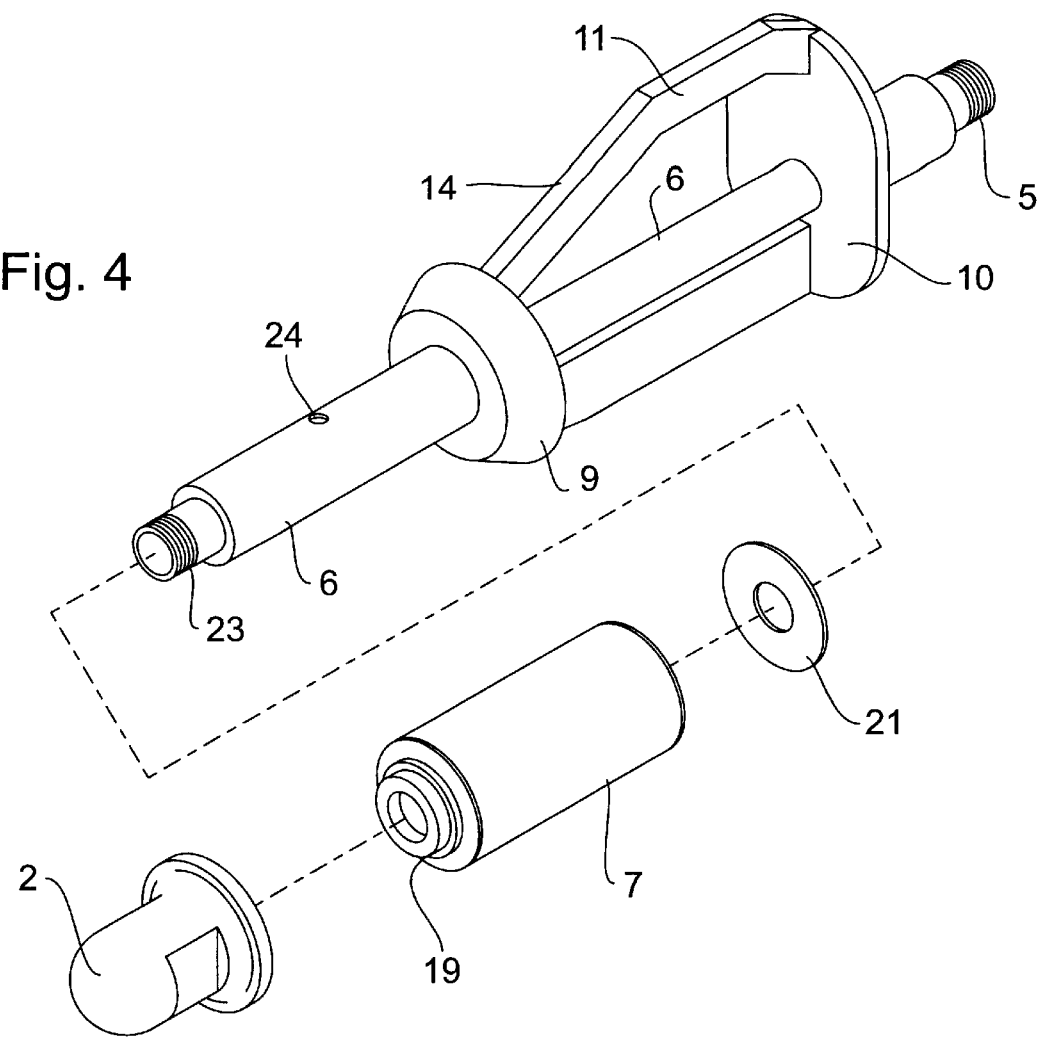
FIG. 4 is similar to FIG. 1 but shows the poultry washer in an exploded view.
Figure 5:
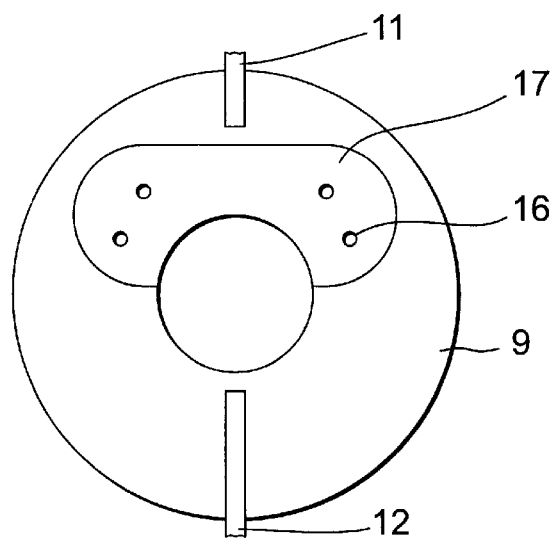
FIG. 5 is a view taken along lines 5—5 of FIG. 3.

Referring to FIGS. 1–5 a preferred poultry washer, generally, 1 attaches to an apparatus (not shown, but the type shown can be seen in U.S. Pat. No. 5,178,579) that is a station on an automated poultry slaughtering line (not shown), and is inserted through a preformed cut formed during evisceration and into a ventral cavity found therein. The poultry washer comprises a rounded flanged knob end 2, a distal region 3, a proximal region 4, and a proximal end 5. The distal region 3 comprises a rotatable cylinder 7 have tangentially directed orifices 8 for rotating the core when pressurized fluid emanates therefrom. The proximal region 4 comprises an intermediate outwardly and radially extending flanged member 9 located adjacent the distal region and a proximal flanged member 10 bridged by two diametrically opposing ribs 11, 12. The flanged member 9 has a surface that slopes radially inwardly in the direction of the distal region. Each rib in has a unique shape, and extend longitudinally about liquid tube 6 which extends longitudinally through both distal region 3 and proximal region 4. It terminates in threaded portion at its distal end and a threaded portion 5 at its proximal end. The knob 2 threaded onto the threaded portion 23. Rib 11 has a camming surface 14 in the direction towards the distal region 3. The intermediate flanged member 9 has a plurality of orifices 13 on a proximally facing wall. Flange 9 has an internal conduit 15 which is in fluid communication with the liquid conduit 6. The flange 9 has a plurality of orifices 16 along the proximately facing wall 17 as can be seen as FIG. 5. The proximal end 5 is attached by male threads to the apparatus (not shown) used for orienting and guiding the washer through a preformed cut and into the ventral cavity of an eviscerate bird.

The cylinder 7 has of a slightly larger inner diameter than the external diameter of the tube 6 to define an annular space 18. The tube 6 has at least one orifice 24 for fluid connection between the inside of tube 6 and space 18. The cylinder 6 has rotable seals 19 and 20 at both ends to seal the space 18. A washer 21 separate the distal region 3 from the proximal region 4.

In operation, a bird hanging by the legs in shackles is conveyed through various processing stations for stunning, bleeding, scalding, plucking, eviscerating, and cleaning. At a cleaning station the eviscerated bird is cleaned with a cleansing liquid on the outside and the inside. When the shackled carcass is at the cleaning station for washing the ventral cavity, the orientation of the bird to the washer may be slightly off due to differences in bird sizes, a slight pendulum movement of the bird in the shackles, and/or a slight difference in the way the bird hangs from the shackles. The washer of this invention assures easy entrance through a preformed cut and into the ventral cavity without causing little or no damage to the eviscerated bird. This is done by a combination of the blunted distal end 2 and the low profiled distal region 3. As the proximal region of the washer enters the bird, the camming surface 14 of the rib 11 nudges the bird towards a position where the long axis of the washer is substantially parallel with the long axis of the ventral cavity. In the correct position, the distal region of the washer will by disposed in the thoracic cavity away from the cavity walls. The ribs 11 and 12 are aligned with the mid-sagittal plane of the carcass. Rib 12 will be adjacent to the lower vertebrae, and rib 11 will be adjacent to the inner anterior wall of the abdominal/pelvic cavity. Once the washer is fully inserted in the ventral cavity, the configuration and orientation of the rib correctly position the washer for optimum cleansing of the cavity walls of the ventral cavity.

In the preferred embodiment, the distal region uses the rotating cylinder 7 having tangential orifices 8 for directing liquid against the thoracic cavity walls. The cylinder 7 is not meant to be limiting in anyway. Orifices on the liquid conduit 6 directed at predetermined regions of the thoracic cavity can be used instead of the cylinder, or any other spraying means known in the art for directing liquid at the cavity walls, as long as the distal region maintains the low radial profile.

A feature of the preferred embodiment is the radially spaced ribs 11 and 12 for aligning the washer in the ventral cavity. The preferred embodiment of the proximal region of the invention comprises two diametrical opposing ribs, but rods, plates, or any other support means for centering the washer in the ventral cavity may be substituted. Also the number of ribs is not restricted to two, and if there are more than two ribs, the ribs are not limited to the mid-sagittal plane of the eviscerated bird. For example three ribs could bridge the spaced flange members 9 and 10 such that a rib is on either side of the vertebrae and a third is in the mid-sagittal plane adjacent to the abdominal/pelvic wall. It is conceivable that a large number of different configurations are possible by varying the number and position of the bars as long as the criteria of correctly positioning of the washer within the ventral cavity is met. It will also be appreciated that placement of the pressurized liquid orifices in the proximal region is not limited to the proximal facing wall 17 of the intermediate flange 9 but can be placed in addition to or in lieu of a region along the liquid conduit 6 and/or the distal facing surface of the distal flange 10. It has even been contemplated that a rotating cylindrical shaped core with tangential orifices may be placed between the flange members. Lastly, the intermediate and the distal flange members 9 and 10 are meant only to be structure support members with the an optional function of having fluid orifices disposed therein, and are not limited to any particular shape or configuration.

The proximal end of the washer is attached to the cleaning apparatus (not shown) by threads 5 but is not meant to limit the attachment to the cleaning apparatus in anyway and may be coupled by any means known in the art or may even be an integral part of the cleaning apparatus.

Whereas the present invention has been described with respect to specific embodiments thereof, it will be understood that various changes and modifications will be suggested to one skilled in the art, and it is intended to encompass such changes and modifications as fall within the scope of appended claims.

What is claimed is:

1. An improved nozzle for poultry washer for cleansing by pressurized liquid the ventral cavity of an eviscerated bird carcass comprising an elongated nozzle assembly divided into a distal region and a proximal region, said nozzle assembly including a central tube, said tube having a first end extending longitudinally beyond said distal region, said tube being closed at said first end with a rounded cap, said tube having, a second end extending longitudinally beyond said proximal region, said tube having means at said second end to be fluidly connected to a source of pressurized liquid, said distal region having a rotatable cylinder about said central tube defining a concentric annular space between said cylinder and said tube, said central tube having a orifice means to permit pressurized liquid to flow out of said central tube and into said space, said space having sealing means at the ends of the cylinder to prevent leakage of pressurized liquid therefrom, said cylinder having a plurality of tangential orifices whereby pressurized liquid released from said space through said orifices rotates said cylinder and provides pressurized liquid to clean said ventral cavity, said proximal region including spaced first and second plates, said first plate and second plates extend radially from said central tube, said first plate being proximate said distal region, said first plate having conduit means, said central tube having orifice means to be in fluid connection with said conduit means of said first plate, said first plate having at least one orifice whereby pressurized fluid may spray therefrom into said ventral cavity, said spaced first plate and said second plate being connected by oppositely disposed first and second ribs, at least one of said ribs having a radially extending portion extending in increasing dimension from said first plate thereby said rib may impinge on said breast portion of said ventral cavity when said nozzle assembly is employed.

2. The improved nozzle for poultry washer of claim 1 wherein said first plate has a round truncated radially portion extending towards said distal portion.

3. The improved nozzle for poultry washer of claim 2 wherein said second plate extends radially outwardly in a first direction and less in a oppositely disposed second directions, said at least one of said ribs having a radially extending portions of increasing dimension connects said first plate and said second plate where it has the most radially outwardly extending direction.

4. The improved nozzle for poultry washer of claim 1, 2 or 3 wherein the first end of said tube is threaded and said rounded cap is a threaded knob.

5. The improved nozzle for poultry washer of claims 1, 2 or 3 wherein said spaced first plate and said second plate are connecting by at least three ribs.

* * * * *